United States Patent
Zhou et al.

(10) Patent No.: US 8,498,987 B1
(45) Date of Patent: Jul. 30, 2013

(54) SNIPPET SEARCH

(75) Inventors: Yuanyuan Zhou, San Diego, CA (US); Spiros Xanthos, Mountain View, CA (US); Qingbo Zhu, Mountain View, CA (US); Xiao Ma, Urbana, IL (US); Zhenmin Li, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 711 days.

(21) Appl. No.: 12/586,720

(22) Filed: Sep. 25, 2009

Related U.S. Application Data

(60) Provisional application No. 61/194,347, filed on Sep. 25, 2008.

(51) Int. Cl.
    *G06F 7/00* (2006.01)
    *G06F 17/30* (2006.01)

(52) U.S. Cl.
    USPC .......................................................... 707/741

(58) Field of Classification Search
    USPC .................................. 707/741, 742
    See application file for complete search history.

(56) References Cited

U.S. PATENT DOCUMENTS

| | | | |
|---|---|---|---|
| 6,816,850 B2* | 11/2004 | Culliss | 707/711 |
| 2002/0087949 A1* | 7/2002 | Golender et al. | 717/124 |
| 2005/0154711 A1* | 7/2005 | McConnell | 707/3 |
| 2007/0299825 A1* | 12/2007 | Rush et al. | 707/3 |
| 2008/0077570 A1* | 3/2008 | Tang et al. | 707/5 |

* cited by examiner

*Primary Examiner* — Fred I Ehichioya
*Assistant Examiner* — Kris Mackes

(57) ABSTRACT

Indexing data is disclosed. A plurality of subunits of data is determined within received data. For a first subunit, a first mapping between the first subunit and a first dictionary entry is determined. For a second subunit, a second mapping between the second subunit and a second dictionary entry is determined. At least the first and second dictionary entries are aggregated into an aggregation and stored in an index. Searching data is also disclosed. A plurality of subunits of data is determined within a received query. For a first subunit, a first mapping is determined between the first subunit and a first dictionary entry. For a second subunit, a second mapping is determined between the second subunit and a second dictionary entry. The first and second dictionary entries are aggregated and used to search an index.

20 Claims, 25 Drawing Sheets

```
static void ap_str_toupper(char *str)
{
    while (*str) {
        *str = apr_toupper(*str);
        ++str;
    }
}
```

FIG. 6A

Event1: [HOSTNAME: leto] [TIMESTAMP: 2008-11-18T09:49:08] [TEST: test23] [SEVERITY: 5] [TYPE: NOTICE]
[MESSAGE: Starting execution of section test23_cleanup]

Event2: [HOSTNAME: leto] [TIMESTAMP: 2008-11-18T09:49:31] [TEST: script] [SEVERITY: 6] [TYPE: INFO]
[MESSAGE: In test23_cleanup section]

Event3: [HOSTNAME: leto] [TIMESTAMP: 2008-11-18T09:49:58] [TEST: script] [SEVERITY: 6] [TYPE: WARNING]
[MESSAGE: Error 218 in test23_cleanup]

Event4: [HOSTNAME: leto] [TIMESTAMP: 2008-11-18T09:50:01] [TEST: script] [SEVERITY: 5] [TYPE: INFO]
[MESSAGE: Completed execution of section test23_cleanup]

FIG. 6B

```
Breaking code down into tokens:
20 21 14 16 22 15 17        ┌─704
18
      11 16 15 17 18
           15 13 14 16 15 17 23
           12 15 23
      19
19
              ┌─702
Dictionary
```

| while | 11 |
| --- | --- |
| ++ | 12 |
| = | 13 |
| function (general) | 14 |
| variable (general) | 15 |
| ( | 16 |
| ) | 17 |
| { | 18 |
| } | 19 |
| static | 20 |
| void | 21 |
| char | 22 |
| ; | 23 |

FIG. 7A

```
Breaking code down into lines:
11
12
      13      ┌─734
           14
           15
      16
16
         ┌─732
Dictionary
```

| static void <function> (char <variable>); | 11 |
| --- | --- |
| { | 12 |
| While (<variable>) { | 13 |
| <variable> = <function>(<variable>); | 14 |
| ++<variable>; | 15 |
| } | 16 |

FIG. 7B

Breaking trace down into event parts:

```
11 12 13 15 17 20  (Event1)  ⁓764
11 12 14 16 18 21  (Event2)
11 12 14 16 19 22  (Event3)
11 12 14 15 18 23  (Event4)
       ⁓762
```

Dictionary

| | |
|---|---|
| HOSTNAME: leto | 11 |
| TIMESTAMP: any-timestamp | 12 |
| TEST: test23 | 13 |
| TEST: script | 14 |
| SEVERITY: 5 | 15 |
| SEVERITY: 6 | 16 |
| TYPE: NOTICE | 17 |
| TYPE: INFO | 18 |
| TYPE: WARNING | 19 |
| MESSAGE: Starting execution of section test23_cleanup | 20 |
| MESSAGE: In test23 cleanup section | 21 |
| MESSAGE: Error 218 in test23 cleanup | 22 |
| MESSAGE: Completed execution of section test23_cleanup | 23 |

FIG. 7C

Grouping tokens into statements:

489b46b5798a050507fc624333ae20ed794cd782 (foo.c, line 11) ⟵ 802
60ba4b2daa4ed4d070fec06687e249e0e6f9ee45 (foo.c, line 12)
8ffe9fbe3f2da141c8a6a6b7f84af017d4f77ac3 (foo.c, line 13)
ade8d01ee6895c3a0c95c6022159619def1c04f1 (foo.c, line 14)
cf46323dfc001be907b71ee7e70123b61bbfb07b (foo.c, line 15)
b3f0c7f6bb763af1be91d9e74eabfeb199dc1f1f (foo.c, line 16)
b3f0c7f6bb763af1be91d9e74eabfeb199dc1f1f (foo.c, line 17)

Dictionary (using SHA-1 Algorithm) ⟵ 804

| | |
|---|---|
| 20211416221517 | 489b46b5798a050507fc624333ae20ed794cd782 |
| 18 | 60ba4b2daa4ed4d070fec06687e249e0e6f9ee45 |
| 1116151718 | 8ffe9fbe3f2da141c8a6a6b7f84af017d4f77ac3 |
| 15131416151723 | ade8d01ee6895c3a0c95c6022159619def1c04f1 |
| 121523 | cf46323dfc001be907b71ee7e70123b61bbfb07b |
| 19 | b3f0c7f6bb763af1be91d9e74eabfeb199dc1f1f |

FIG. 8A

Grouping Statements to Functions: ⟵ 854

52ce3dd3bf59f2cf81510dc7dfe0852eae73ad5f (foo.c, lines 11-17)

Dictionary (using SHA-1 Algorithm)

| | |
|---|---|
| 11121314151616 | 8eb3821b627a898cefddadbf6504abc1936b6e13 |

Grouping event parts into events:

94c8e4da46c4947ebbeecf7892269b9a98653 96c (test.trace, event1, lines 1, 2)
cfd6abee1aeb0fb8ce25437387a70479f72407df (test.trace, event2, lines 3, 4)
2e0727543 1837b118bdd76b65225d44ecfa2a7e4 (test.trace, event3, lines 5, 6)
8928d5aca1091a71748148 3004f694d35f18158d (test.trace, event4, lines 7, 8)

Dictionary (using SHA-1 Algorithm)

| | |
|---|---|
| 1112131511720 | 94c8e4da46c4947ebbeecf7892269b9a98653 96c |
| 1112141611821 | cfd6abee1aeb0fb8ce25437387a70479f72407df |
| 1112141611922 | 2e0727543 1837b118bdd76b65225d44ecfa2a7e4 |
| 1112141511823 | 8928d5aca1091a71748148 3004f694d35f18158d |

FIG. 8C

| Loading statements into data structure: | |
| --- | --- |
| 489b46b5798a050507fc624333ae20ed794cd782 | Foo.c, line 11 |
| 60ba4b2daa4ed4d070fec06687e249e0e6f9ee45 | Foo.c, line 12 |
| 8ffe9fbe3f2da141c8a6a6b7f84af017d4f77ac3 | Foo.c, line 13 |
| ade8d01ee6895c3a0c95c6022159619def1c04f1 | Foo.c, line 14 |
| cf46323dfc001be907b71ee7e70123b61bbfb07b | Foo.c, line 15 |
| b3f0c7f6bb763af1be91d9e74eabfeb199dc1f1f | Foo.c, line 16<br>Foo.c, line 17 |

FIG. 9A

| Loading functions into data structure: | |
| --- | --- |
| 52ce3dd3bf59f2cf81510dc7dfe0852eae73ad5f | Foo.c, lines 11-17 |

FIG. 9B

```
*str = apr_toupper(*str);
int x = 1
++str;
```

FIG. 11

```
Breaking the input query into tokens:
15 13 14 16 15 17 23
24 15 13 25 23
12 15 23
```

Dictionary

| while | 11 |
|---|---|
| ++ | 12 |
| = | 13 |
| function (general) | 14 |
| variable (general) | 15 |
| ( | 16 |
| ) | 17 |
| { | 18 |
| } | 19 |
| static | 20 |
| void | 21 |
| char | 22 |
| ; | 23 |
| int | 24 |
| constant (general) | 25 |

⎫ 1202

Grouping to statements then hash with SHA-1 algorithm:

ade8d01ee6895c3a0c95c6022159619def1c04f1  ⎱ 1204
83a834253b3d5e1939fdd290c1f944a99c9e624f
cf46323dfc001be907b71ee7e70123b61bbfb07b

Dictionary(using SHA-1 Algorithm)

| 20211416221517 | 489b46b5798a050507fc624333ae20ed794cd782 |
|---|---|
| 18 | 60ba4b2daa4ed4d070fec06687e249e0e6f9ee45 |
| 1116151718 | 8ffe9fbe3f2da141c8a6a6b7f84af017d4f77ac3 |
| 15131416151723 | ade8d01ee6895c3a0c95c6022159619def1c04f1 |
| 121523 | cf46323dfc001be907b71ee7e70123b61bbfb07b |
| 19 | b3f0c7f6bb763af1be91d9e74eabfeb199dc1f1f |
| 2415132523 | 83a834253b3d5e1939fdd290c1f944a99c9e624f |

FIG. 12A

Using Processed Input: ⟵1252
ade8d01ee6895c3a0c95c6022159619def1c04f1
83a834253b3d5e1939fdd290c1f944a99c9e624f
cf46323dfc001be907b71ee7e70123b61bbfb07b and Using Data Structure:

| | |
|---|---|
| 489b46b5798a050507fc624333ae20ed794cd782 | Foo.c, line 11 |
| 60ba4b2daa4ed4d070fec06687e249e0e6f9ee45 | Foo.c, line 12 |
| 8ffe9fbe3f2da141c8a6a6b7f84af017d4f77ac3 | Foo.c, line 13 |
| ade8d01ee6895c3a0c95c6022159619def1c04f1 | Foo.c, line 14 |
| cf46323dfc001be907b71ee7e70123b61bbfb07b | Foo.c, line 15 |
| b3f0c7f6bb763af1be91d9e74eabfeb199dc1f1f | Foo.c, line 16 |
| | Foo.c, line 17 |

⟵1254

Candidates: ⟵1256
ade8d01ee6895c3a0c95c6022159619def1c04f1 AND
cf46323dfc001be907b71ee7e70123b61bbfb07b

FIG. 12B

Breaking input query into lines:
14
17
15

Dictionary

| | | |
|---|---|---|
| Static void <function> (char <variable>); | 11 | ⌒1302 |
| { | 12 | |
| while (<variable>) { | 13 | |
| <variable> = <function>(<variable>); | 14 | |
| ++<variable>; | 15 | |
| } | 16 | |
| int <variable> = <constant>; | 17 | |

Grouping to functions then hash with SHA-1 algorithm:
⌒1304
d96c0ec59a68a39b687cc4ee43e237dbba56cee3

Dictionary (using SHA-1 Algorithm)

| 141715 | d96c0ec59a68a39b687cc4ee43e237dbba56cee3 |
|---|---|

FIG. 13A

Using Processed Input:
d96c0ec59a68a39b687cc4ee43e237dbba56cee3 ⌐1352 and Using Data Structure:
| 52ce3dd3bf59f2cf81510dc7dfe0852eae73ad5f | Foo.c, lines 11-17 |

⌐1354

Candidates: ⌐1356
No Match.

FIG. 13B

Query Input:
```
*str = apr_toupper(*str);
int x = 1
++str;
```

Query Result:
```
*str = apr_toupper(*str);
++str;
```

Edit distance of 10, using Levenshtein distance equation.

10/31 (total characters) = 32%.

FIG. 15

Query Input:
```
*str = apr_toupper(*str);
int x = 1
++str;
```

Assume two matches:
    Match 1:
```
*str = apr_toupper(*str);
++str;
```

Match 2:
```
*str = apr_toupper(*str);
int y = 1
```

Using Levenshtein distance equation:
- The edit distance of Match 1 and the input query is: 10 (32%)
- The edit distance of Match 2 and the input query is: 8 (26%)

A score of 1 – [distance-percentage] is assigned to each match:
- Match 1 score = 1–0.32 = .068
- Match 2 score = 1–0.26 = .074

Since Match2 score > Match 1 score, Match 2 is ranked higher than Match 1

FIG. 16

```
Programming Language
C/C++
Metadata Filter
Type:
Path Filter
Example: src/tree.c, src/*.h, fs/*
Keyword Filter
Example: kmalloc OR x OR y
Fuzziness
              Exact search    Fuzzy search
Project/Branch Filter
Custom Filter   Saved Filter
Project
Type to narrow list
 ☐ backend-search
 ☐ camino
 ☐ codeinsight
 ☐ firefox
 ☐ linux
 ☐ longname
 ☐ php
 ☐ pimerge
Select: none all
```

FIG. 18

```
                                                        ⌕ Search
                                                        1802

Language:c  Fuzziness:2
linux 2.6.29-rc8 - net/core/flow.c
                       flow_resolve_t resolver)
169  {
170      struct flow_cache_entry *fle, **head;
171      unsigned int hash;
172      int cpu;
173
174      local_bh_disable();
175                                              Exact Match  1806 codeinsight dev - backend/subsystems/parsing/tcl/generic/tclHash.c
267      register Tcl_HashEntry *hPtr;
268      const Tcl_HashKeyType *typePtr;
269      unsigned int hash;
270      int index;
271
272      if (tablePtr->keyType == TCL_STRING_KEYS) { linux 2.6.29-rc8 - arch/ia64/kernel/perfmon.c
5689         unsigned long psr;
5690         unsigned int i;
5691         int cpu;
5692
5693
5694     if (v == PFM_PROC_SHOW_HEADER) {
``` struct flow_cache_entry *fle, **head;
unsigned int hash;
int cpu;

```
codeinsight dev - testdata/tcl/versions/8.4.19/orig src/generic/tclHash.c
278        register Tcl_HashEntry *hPtr;
279        Tcl_HashKeyType *typePtr;
280        unsigned int hash;
281        int index ;
282
283    #if TCL_PRESERVE_BINARY_COMPATABILITY
linux 2.6.29-rc8 - arch/powerpc/oprofile/op_model_cell.c
889    {
890        int subfunc;
891        unsigned int lfsr_value;
892        int cpu;
893        int ret;
894        int rtas_error;
linux 2.6.29-rc8-drivers/cpufreq/cpufreq_ondemand.c
70         unsigned int freq_lo*
```

Branch

Type to narrow list

Select: none all

Snippet Search Results > linux 2.6.29-rc8

| linux 2.6.29-rc8 | /net/core/flow.c | View plain cod | net/core/flow.c

▸ ☐ arch
▸ ☐ block
▸ ☐ crypto
▸ ☐ Documentation
▸ ☐ drivers
▸ ☐ firmware
▸ ☐ fs
▸ ☐ include
▸ ☐ init
▸ ☐ ipc
▸ ☐ kernel  ⟵ 1904
▸ ☐ lib
▸ ☐ mm
▾ ☐ net
  ▸ ☐ 802
  ▸ ☐ 8021q
  ▸ ☐ 9p

```
 92    flow_count (cpu)--;
 93  }
 94
 95  static void flow_cache_shrink(int cpu, int shrink_to)
 96  {
 97    struct flow_cache_entry *fle, **flp;   ⟵ 1902
 98    int i,j;
 99
100    for( i = 0; i < flow_hash_size; i++) {
101      int k = 0;
102
103      flp = & flow_table(cpu) [i];
104      while ((fle = *flp) != NULL && k < shrink_to) {
105        k++;
106        flp = &fle->next;
107      }
108      while ((fle = *flp) != NULL) {
109        *flp = fle->next;
110        flow_entry_kill(cpu, fle) ;
111      }
112    }
113  }
114
115  static void flow_cache_shrink(int cpu)
116  {
117    int shrink_to = flow_lwm / flow_hash_size;
118
119    flow_cache_shrink (cpu, shrink_to);
120  }
121
122  static void flow_new_hash_rnd(int cpu)
123  {
```

```
124      get_random_bytes(&flow_hash_rnd(cpu), sizeof(u32));
125      flow_hash_rnd_recalc(cpu) = 0;
126  }
127      __flow_cache_shrink(cpu, 0);
128  }
129
130  static u32 flow_hash_code(struct flowi *key, int cpu)
131  {
132      u32 *k = (u32 *) key;
133
134      return (jhash2(k, (sizeof(*key) / sizeof(u32)), flow_hash_rnd(cpu)) &
135              (flow_hash_size - 1));
136  }
137
138  #if (BITS_PER_LONG == 64)
139  typedef u64 flow_compare_t;
140  #else
141  typedef u32 flow_compare_t;
142  #endif
143
144  /* I hear what you're saying, use memcmp. But memcmp cannot make
145   * important assumptions that we can here, such as alignment and
146   * constant size.
147   */
148  static int flow_key_compare(struct flowi *key1, struct flowi *key2)
149  {
150      flow_compare_t *k1, *k1_lim, *k2;
151      const int n_elem = sizeof(struct flowi) / sizeof(flow_compare_t);
152
153      BUILD_BUG_ON(sizeof(struct flowi) & sizeof(flow_compare_t));
```

- appletalk
- atm
- ax25
- bluetooth
- bridge
- can
- ▼ core
  - datagram.c
  - dev.c
  - dev_mcast.c
  - dst.c
  - ethtool.c
  - fib_rules.c
  - filter.c
  - flow.c
  - gen_estimator.c

FIG. 19 (Cont.)

SNIPPET SEARCH

CROSS REFERENCE TO OTHER APPLICATIONS

This application claims priority to U.S. Provisional Patent Application No. 61/194,347 entitled SNIPPET SEARCH filed Sep. 25, 2008, which is incorporated herein by reference for all purposes.

BACKGROUND OF THE INVENTION

A variety of techniques exist for searching a data set, given a query. One technique is to locate identical copies of the query in the data set. Unfortunately, if only identical matches are located and returned, the user will not be presented with similar, but non-identical results that might have been desirable to the user. For example, if a user provides as input ten particular words, and only identical matches are returned, documents in which nine of the ten words are present will not be returned, even though the user would likely consider such results of interest. It is also possible that all ten words will be present but in a different order from the one in the given query or with other words intermixed. In such cases the user may also not be presented with such matches, even though they may be relevant.

Another technique is to search the data set for keywords in the query. One problem with keyword searches, however, is that if the query includes common words, an overwhelming number of results may be returned to the user.

BRIEF DESCRIPTION OF THE DRAWINGS

Various embodiments of the invention are disclosed in the following detailed description and the accompanying drawings.

FIG. 6A illustrates an embodiment of a portion of data.

FIG. 6B illustrates an embodiment of a portion of data.

FIG. 7A illustrates an example of a portion of source code being processed.

FIG. 7B illustrates an example of a portion of source code being processed.

FIG. 7C illustrates an example of system trace data being processed.

FIG. 8A illustrates an example of data being processed.

FIG. 8B illustrates an example of data being processed.

FIG. 8C illustrates an example of data being processed.

FIG. 9A illustrates statements as loaded into an example data structure.

FIG. 9B illustrates functions as loaded into an example data structure.

FIG. 11 illustrates an example of a query.

FIG. 12A illustrates an embodiment of a query being processed.

FIG. 12B illustrates an embodiment of a query being processed.

FIG. 13A illustrates an embodiment of a query being processed.

FIG. 13B illustrates an embodiment of a query being processed.

FIG. 15 illustrates an example of an edit distance computation.

FIG. 16 illustrates the ranking of results.

FIG. 18 is an example of an interface, as rendered in a browser.

FIG. 19 is an example of an interface, as rendered in a browser.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
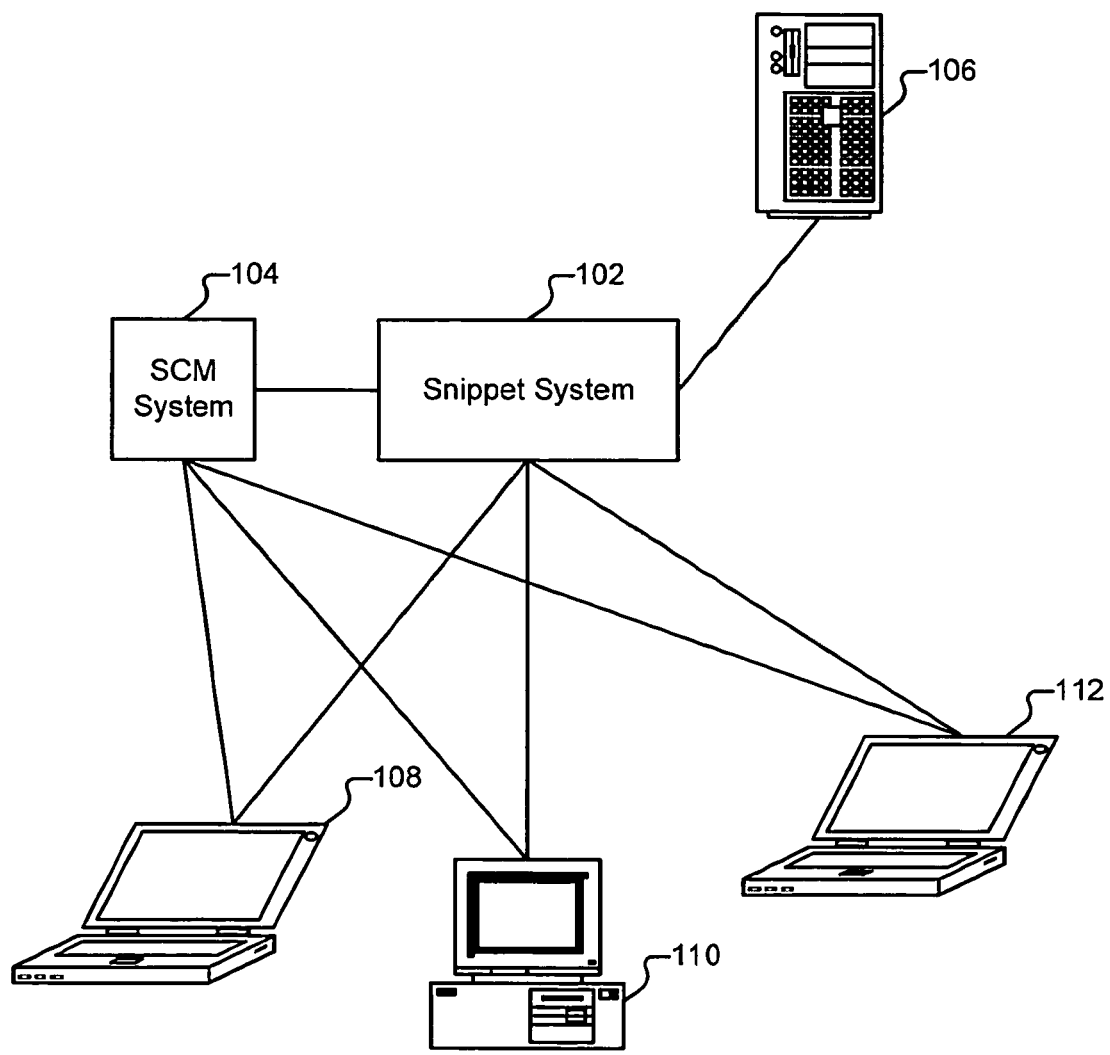
FIG. 1 illustrates an example of an environment in which data indexing and searching is provided.

FIG. 1 illustrates an example of an environment in which data indexing and searching is provided. In the example shown snippet system 102 indexes data (such as source code stored within a source code management (SCM) system 104). In addition to source code, snippet system 102 can be configured to index a variety of other structured data, including test trace data and log file data. Snippet system 102 is managed by an administrator (e.g., using a client 106) and provides search functionality to various clients 108-112. Each of the nodes 102-112 in the environment shown in FIG. 1 is included in a corporate network belonging to a medium-sized software company (hereinafter referred to as "Acme"). Acme makes a variety of software products and maintains in SCM 104 several gigabytes of source code.

Clients 108-112 are under the control of Acme employees "Alice," "Bob," and "Charlie," respectively. Alice, Bob, and Charlie are all developers for Acme. They each contribute new source code and code edits to SCM 104.

Typically, functions and other portions of source code are replicated (and modified) throughout a code base. For example, if Alice writes a function that elegantly resizes and rotates an image, her code may be copied by Bob and adapted for use within the source code he writes and/or maintains. Such code might be copied exactly, but more frequently may be altered first. For example, Bob may change variable names and function names before including Alice's code into his code. Charlie may likewise copy portions of either Alice or Bob's code, and may make additional changes such as the addition or deletion of various lines.

Suppose Alice determines that a portion of her image rotation code includes a bug. She is concerned that the bug may appear elsewhere in her project and is also concerned that other employees may have reused portions of her code in different projects, thus potentially propagating the bug into their own projects. As described in more detail below, using the techniques described herein, Alice can provide to snippet system 102 a snippet of code that includes the bug and receive back a list of other instances of source code where the bug appears (or potentially appears). The results that Alice receives back will include any identical copies of the code, but can also include relevant non-identical matches. Searches for other types of snippets, such as code traces, can also be performed, using the techniques described herein, adapted as applicable.

Figure 2:
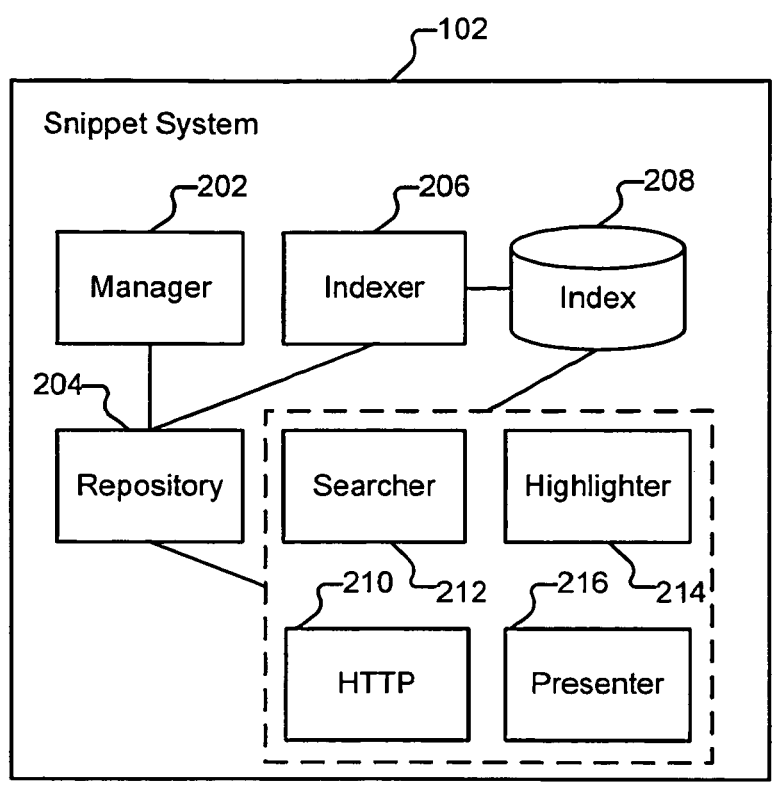
FIG. 2 illustrates an embodiment of a snippet system.

FIG. 2 illustrates an embodiment of a snippet system. In the example shown snippet system 102 includes a manager 202 that is configured to periodically communicate with SCM system 104 and copy source contained within SCM system 104 into a repository 204, along with associated metadata. Examples of associated metadata include the project to which the source code belongs, branch information, etc. Manager 202 can also be configured to store into repository 204 data obtained from one or more file locations (e.g., a /src/ directory), or any other applicable data source, instead of or in addition to an SCM system. Information, such as how frequently to access SCM system 104, and any credentials (such as login and password information) needed to access SCM system 104 can be configured by an administrator of system 102 as applicable. In various embodiments, repository 204 is configured to store system trace data, log data, and/or other forms of structured data.

Indexer 206 uses the information stored in repository 204 to construct an index 208, as described in more detail below. Queries (e.g., snippets of code) are submitted to snippet server 102 via one or more interfaces to HTTP server 210, which is also configured to provide results in an appropriate format. For example, HTTP server 210 is configured to provide users (such as Alice) with a form into which queries may be submitted, and to provide as output HTML. HTTP server 210 is also configured to provide an interface that can be used by applications (such as may be running on client 112) to submit queries and receive results in a machine parsable format, such as XML.

As described in more detail below, searcher 212 is configured to receive queries (e.g., from HTTP server 210), to process the queries, search index 208 using the processed information, and return results (e.g., back to HTTP server 210). The returned results are optionally augmented with information provided by highlighter 214 (which highlights the results within additional surrounding data) and presenter 216 (which indicates where the results are located within a hierarchy) prior to being returned to the query originator (i.e., a user or an application).

In the example shown in FIG. 2, snippet server 102 comprises typical, commercially available server hardware and runs a Linux operating system. Other appropriate hardware configurations can also be used. For example, in some embodiments snippet server 102 comprises commodity desktop computer hardware. In some embodiments, the infrastructure provided by portions of snippet system 102 is located on and/or replicated across a plurality of devices rather than the entirety of snippet system 102 being collocated on a single platform. For example, in some embodiments repository 204 is located on network attached storage (NAS).

Whenever snippet system 102 is described as performing a task (such as receiving a query from a client), either a single component or a subset of components or all components of snippet system 102 may cooperate to perform the task. Additionally, in some embodiments portions of snippet system 102 are omitted. For example, instead of indexing data stored in repository 204, indexer 206 can be configured to index the contents of SCM system 104 directly, the repository 204 is omitted, and the techniques described herein adapted accordingly.

Figure 3:
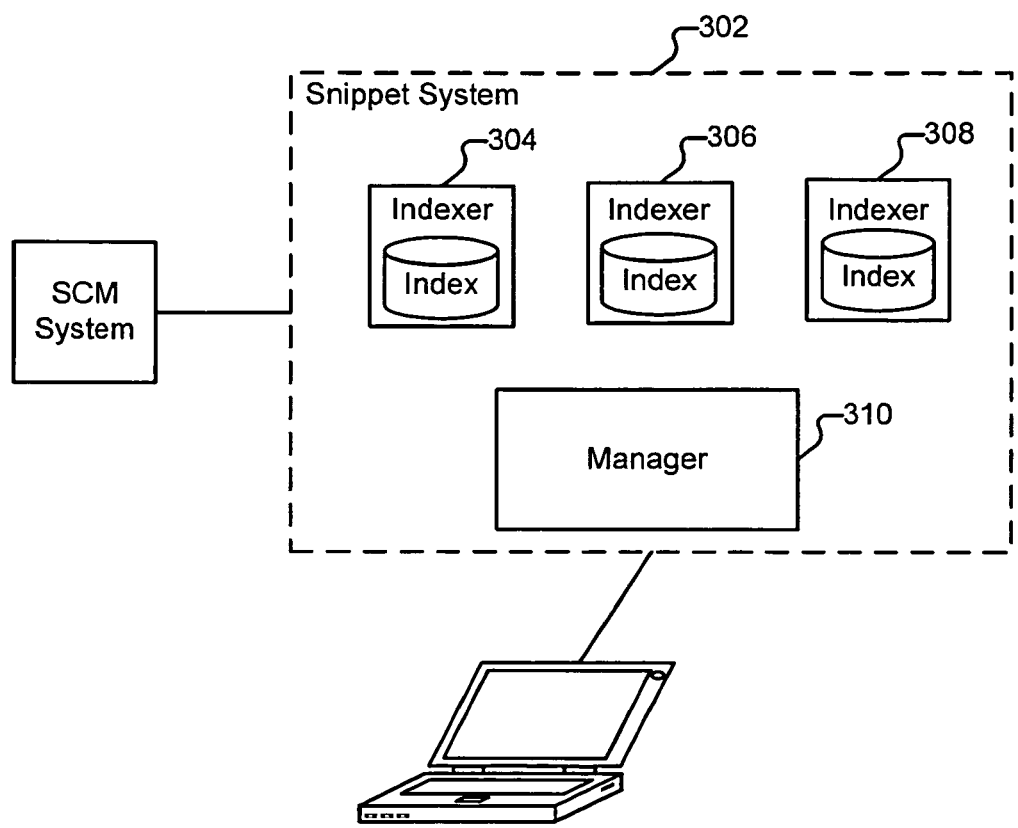
FIG. 3 illustrates an example of an environment in which data indexing and searching is provided.

FIG. 3 illustrates an example of an environment in which data indexing and searching is provided. In the example shown, snippet system 302 is owned by a large corporation whose codebase is much larger, and more complex than Acme's, and is also replicated in multiple physical locations. In the example shown, snippet system 302 comprises several different physical, geographically disparate components. For example, each of indexers 304-308 indexes a respective portion of corporation's code base and stores the corresponding information in a respective index. Additional indexers (not shown) replicate the data stored by indexers 304-308. Manager 310 coordinates the indexers' indexing efforts and also provides the functionality of elements 210-214 to users. When manager 310 receives a query, it in turn requests results from each of nodes 304-308 and assembles the results. In some embodiments multiple managers 310 are included, such as to meet load balancing and other data availability requirements.

Figure 4:
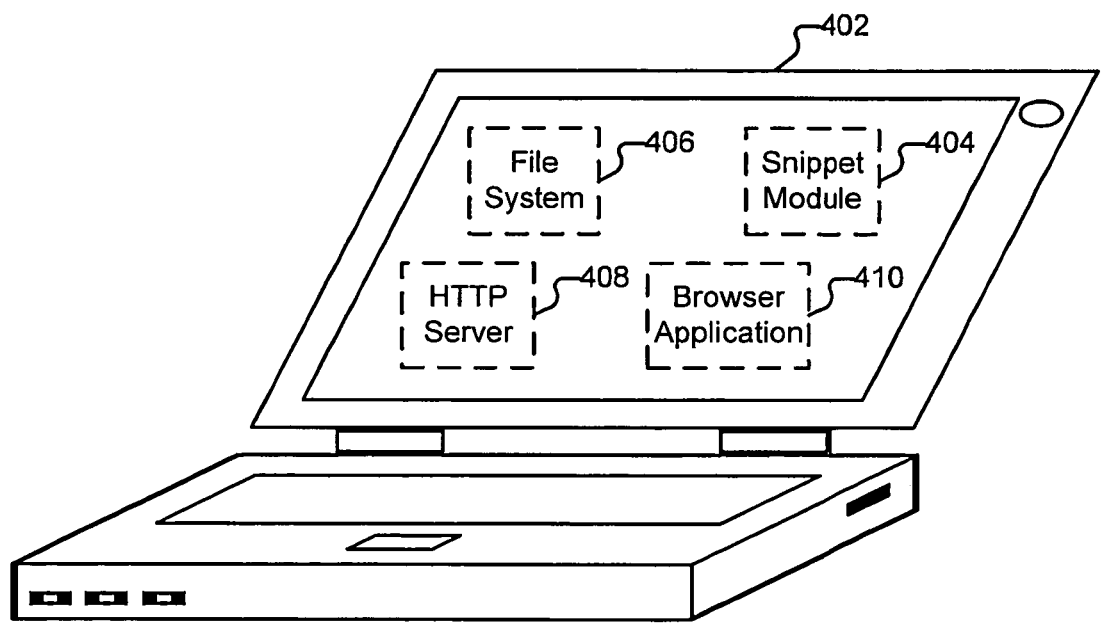
FIG. 4 illustrates an example of an environment in which data indexing and searching is provided.

FIG. 4 illustrates an example of an environment in which data indexing and searching is provided. In the example shown, the environment comprises a typical commodity notebook computer. Snippet module 404 is an application (or suite of applications, as applicable) that is configured to provide indexing and searching functions to a user in accordance with the techniques described herein. Snippet module 404 is configured by a user (e.g., the owner of the notebook computer) to index the file system (406) of the notebook computer. System 402 also includes a local HTTP server 408 that receives and responds to user queries that are submitted by the user via browser application 410 configured to communicate with HTTP server 408 over a local port.

Indexing

Figure 5:
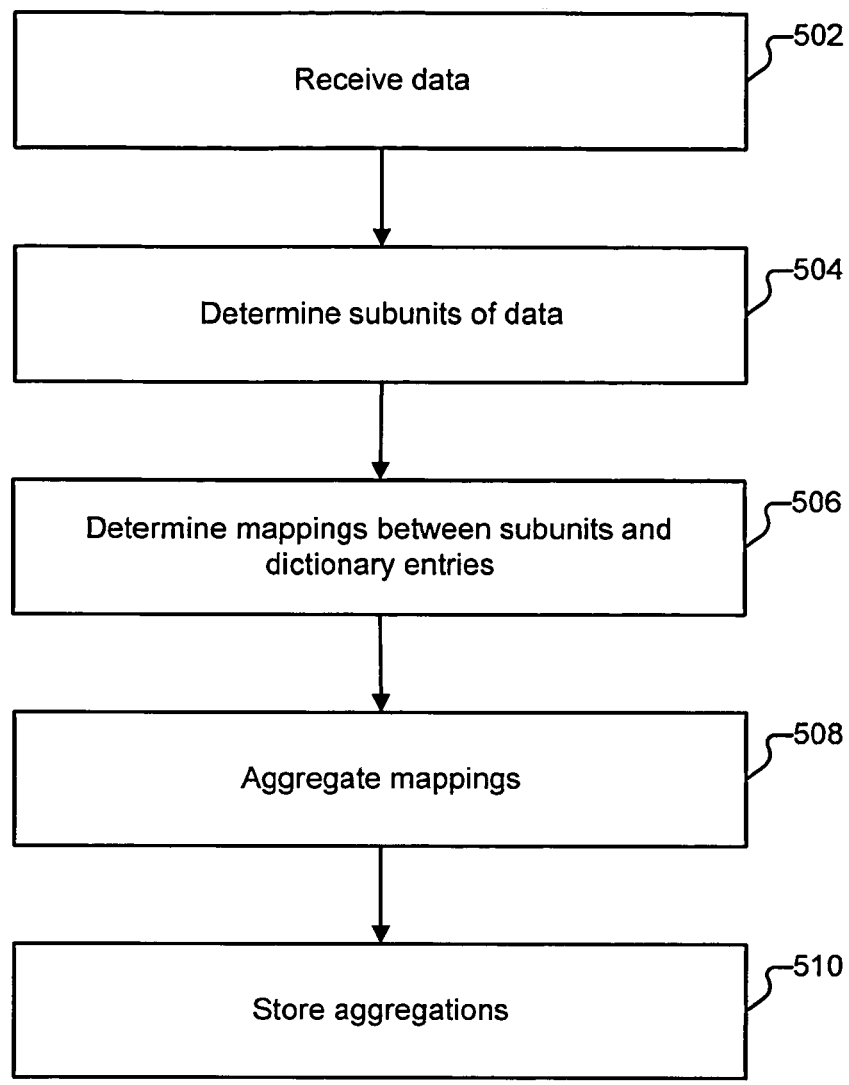
FIG. 5 illustrates an embodiment of a process for indexing data.

FIG. 5 illustrates an embodiment of a process for indexing data. In various embodiments, the process shown in FIG. 5 or portions thereof is performed by snippet system 102. The process begins at 502 when data is received. As one example (which will be explained in more detail below), at 502, indexer 206 retrieves a file, such as "foo.c" from repository 204. At 504, subunits of data are determined. For example, foo.c comprises several lines of source code, and each line of source code can be used of a subunit in the process shown in FIG. 5. At 506, mappings between subunits of the data and entries in a dictionary are determined. As one example, each line of foo.c is compared against a dictionary of lines of code, and each is mapped to a numerical representation based on the comparison. In some embodiments the dictionary is preconfigured with a lexicon applicable to the structured data that will be processed. For example, snippet system 102 can be preconfigured with a first dictionary applicable to C++ programs, another dictionary applicable to Java programs, yet another dictionary applicable to system traces, etc. The dictionary can also be generated automatically while parsing the received data. As one example, an automatically generated dictionary can be configured to monotonically increase as new subunits are encountered. In order to accommodate changes in identifiers (for instance, variable names or function names), in some embodiments each identifier of the same type is mapped to the same numerical representation. Another way to handle changes to identifiers is to build queries to handle wildcards in the search queries.

At 508, the determined mappings are aggregated and then stored (510), such as in index 208. A variety of techniques can be used to store the data at 510, including inverted indices and relations. As will be discussed in more detail below, in various embodiments, portions of the process shown in FIG. 5 may be performed simultaneously or combined into a single step, as applicable. Portions of the process shown in FIG. 5 may also be omitted, as applicable.

FIG. 6A illustrates an embodiment of a portion of data. The example shown is a function, written in C++, and is an example of data stored in repository 204 that can be received at 502 of the process shown in FIG. 5. The subunits of the data depicted in FIG. 6A can be determined (504) in a variety of ways. As mentioned above, one example subunit for source code is a line of code. Another example subunit for source code is a function and yet another example subunit is a token.

FIG. 6B illustrates an embodiment of a portion of data. The example shown is a system trace, and is an example of data stored in a repository such as repository 204 that can be received at 502 of the process shown in FIG. 5. The subunits of the data depicted in FIG. 6B can be determined (504) in a variety of ways. One example subunit for system trace data is a line. Another example subunit for system trace data is a message.

FIG. 7A illustrates an example of a portion of source code being processed. In the example shown, suppose the subunit (504) determined for the source code depicted in FIG. 6A is tokens. A dictionary of tokens (such as "while" and "++") is shown in region 702. Each dictionary entry has a corresponding numerical value. For example, for the token, "while," the numerical value is 11. The source code can be represented (704) according to a mapping between the tokens of the source code and the applicable dictionary entry. As one example, the second line of the source code of FIG. 6A includes a single token: "{." At 506 in the process shown in FIG. 5, it is determined that the token "{" is present in dictionary 702 with a mapping value of "18." As another example, the fifth line ("++str;") comprises three tokens, which map to dictionary entries 12, 15, and 23, respectively. In some embodiments, to optimize storage and lookups, the individual chunks of numeric data (e.g., "12," "15," and "23") are aggregated (508) into a compact representation of the larger blocks of data. One way of doing this includes grouping the smaller pieces of data (corresponding to the subunits of 504) into statements, functions, pages of code, and even complete files. For example, the first line of the source code shown in FIG. 6A can be represented as "20 21 14 16 22 15 17" ("20211416221517" once white space is removed). This value is a concatenation of the individual values determined for each of the tokens per the dictionary. The concatenation is an example of an aggregation that can be performed in accordance with portion 508 of the process shown in FIG. 5. The second line of the source code shown in FIG. 6A is a single value, "18," and its "aggregation" would be the same value—"18." As will be described in more detail below, additional processing can be performed as part of the aggregation, such as concatenating the mapped values and then hashing them with a cryptographic or other hash. Other techniques can also be used to construct a larger bock from the smaller units, as applicable.

FIG. 7B illustrates an example of a portion of source code being processed. In the example shown, suppose the subunit (504) determined for the source code depicted in FIG. 6A is lines. A dictionary of lines is shown in region 732. As with the example shown in FIG. 7A, each dictionary entry has a corresponding numerical value. The source code can be represented (734) according to a mapping between the lines of the source code and the applicable dictionary entries.

FIG. 7C illustrates an example of system trace data being processed. In the example shown, suppose the subunit (504) determined for the system trace data depicted in FIG. 6B is event parts. A dictionary of event parts is shown in region 762. As with the examples shown in FIGS. 7A and 7B, each dictionary entry has a corresponding numerical value. The event parts can be represented (764) according to a mapping between the event parts and the applicable dictionary entries. In the dictionary shown in 762, all timestamps map to the same numeric value, thus allowing for tolerance of different values in the field. For the other event parts, a different numeric value is used for every possible value. In some embodiments the dictionary is not pre-populated but is instead generated on demand. For example, the textual value of each event part can be hashed using a standard hashing function to generate a numeric value, and the numeric value will be the same for all the event value that have the same text.

FIG. 8A illustrates an example of data being processed. In the example shown, as part of the aggregation process performed with respect to the example discussed in conjunction with FIG. 7A, a SHA-1 hash is applied to each block of concatenated values. For example, the value "20211416221517" (corresponding to the first line of the source code) is hashed with a result of "489b46b5798a050507fc624333ae20ed794cd782." A hash of each of the other blocks is also performed. In some embodiments a second dictionary (e.g., of hashes) is employed, such as is shown in region 804, for example, as an optimization. Various other techniques can be used to aggregate the smaller units of data (such as tokens) into large units (such as statements), such as bitwise operations of their bit representation (e.g exclusive OR) or entropy coding (e.g. Huffman coding).

FIG. 8B illustrates an example of data being processed. In the example shown, the value shown in region 852 corresponds to a concatenation of the values shown at 734 in FIG. 7B. A hash of the block is taken and is shown at 854. In the example shown, the aggregation groups statements into functions.

FIG. 8C illustrates an example of data being processed. In the example shown, system trace event parts are grouped into events, using techniques similar to those described in conjunction with FIGS. 8A and 8B.

FIG. 9A illustrates statements as loaded into an example data structure. In the example shown, indexer 206, after performing the processing described in conjunction with FIGS. 7A and 8A stores statements in index 208 along with metadata that indicates where the statements (in the original form) can be found. As illustrated in FIG. 9A (and the processing described previously), the token "}" is present in both lines 16 and 17 of the foo.c file.

FIG. 9B illustrates functions as loaded into an example data structure. In the example shown, indexer 206, after performing the processing described in conjunction with FIGS. 7B and 8B stores a function in index 208 along with metadata that indicates where the function (in the original form) can be found. Indexer 206 can similarly store in index 208 information pursuant to the processing described in conjunction with FIGS. 7C and 8C.

Searching

Once data has been processed and stored in a data structure for retrieval, searches may be performed against it.

Figure 10:
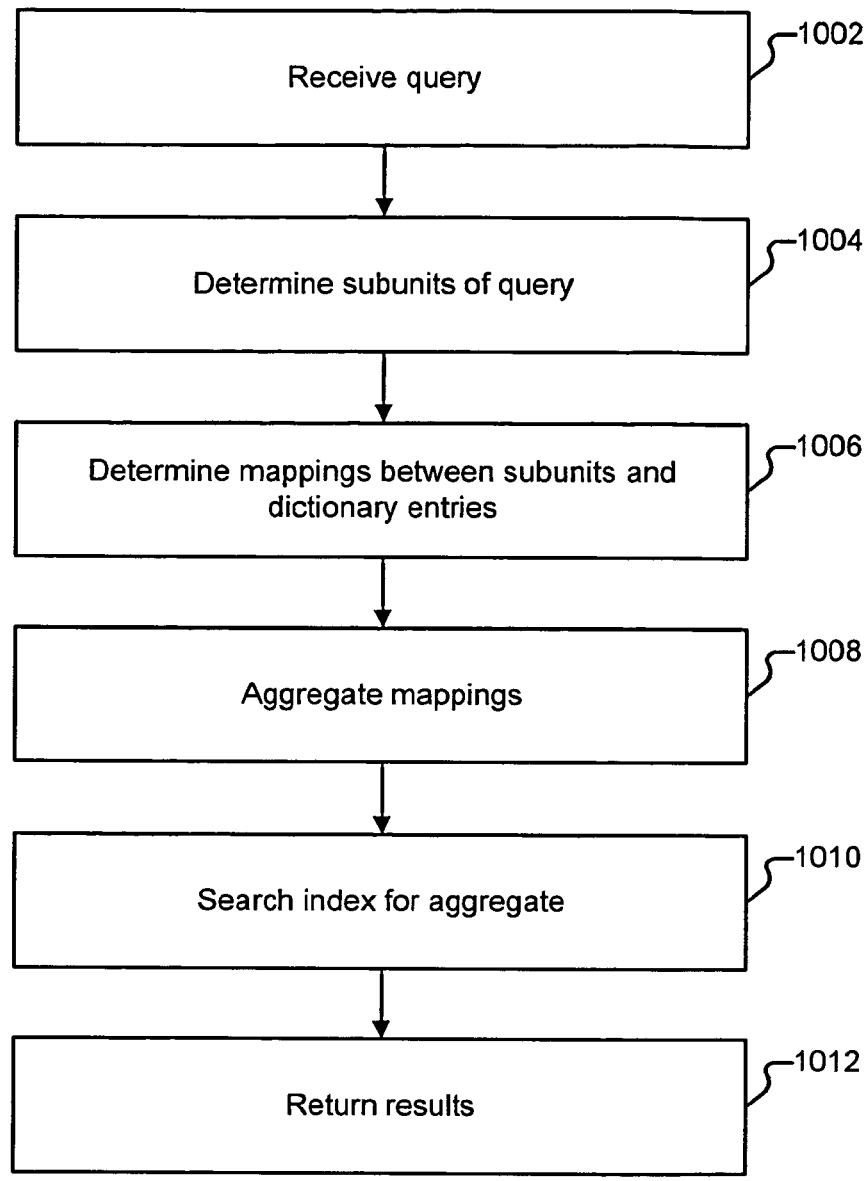
FIG. 10 illustrates an embodiment of a process for searching data.

FIG. 10 illustrates an embodiment of a process for searching data. In various embodiments, the process shown in FIG. 10 or portions thereof is performed by snippet system 102. The process begins at 1002 when a query is received. As one example, a query is received at 1002 when Alice supplies source code corresponding to her bug (or any other code she wishes to locate) into a search form made available via HTTP server 210. As will be described in more detail below, processing similar to that performed in the indexing process described in FIG. 5 is then performed. For example, subunits of the query are determined at 1004. At 1006, mappings between the subunits of the query and dictionary entries are determined. At 1008, the determined mappings are aggregated (e.g., according to the same techniques that were used to aggregate data during indexing). At 1010, the aggregated information is used to search index 208. At 1012 results are returned.

Figure 11:
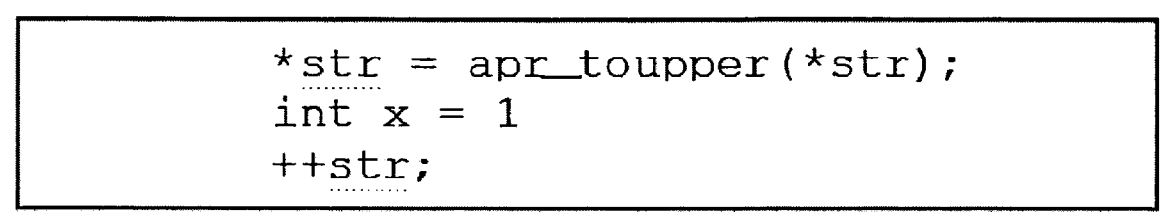

FIG. 11 illustrates an example of a query. The example shown represents a snippet of source code, as provided by Alice into a search interface. Other snippets of other types of data (such as system trace data) can be similarly provided.

FIG. 12A illustrates an embodiment of a query being processed. In the example shown, the received query (1002) is parsed, using tokens as the subunit (1004). Mappings between subunits of the received query and entries in dictionary 1202 are determined (1006). The mappings are concatenated in a manner similar to that performed in conjunction with the process of FIG. 5 and hashed (1204) to form an aggregation in accordance with portion 1008 of the process shown in FIG. 10.

FIG. 12B illustrates an embodiment of a query being processed. In the example shown, the index (including the data shown in region 1254) is searched (1010) for the aggregations (1252). Region 1256 depicts a partial set of candidate results which contain code that potentially contains the query input. In some embodiments, the results shown in region 1256 are returned to the user and the process ends. However, in various embodiments, additional processing is performed to improve the likelihood of the returned results being relevant. The results shown in region 1256 are "candidate" results and not necessarily "final" results. One reason the results are "candidate" results at this stage is that the chunks of data returned from the search could occur anywhere in a file, and in any order. The returning of final results (1012), such as to a user, is described in more detail below.

FIG. 13A illustrates an embodiment of a query being processed. In the example shown, the received query (1002) is parsed, using lines as the subunit (1004). Mappings between subunits of the query and entries in dictionary 1302 are determined (1006). The mappings are concatenated in a manner similar to that performed in conjunction with the process of FIG. 5 and hashed (1304) to form an aggregation in accordance with portion 1008 of the process shown in FIG. 10.

FIG. 13B illustrates an embodiment of a query being processed. In the example shown, the index (including the data shown in region 1354) is searched for the aggregations (1352). In the example shown, it is determined from the search (1356) that no candidate matches are present in index 208.

Examining Candidates

The candidate set includes every file that contains at least one piece of the processed query input. A variety of techniques can be used to evaluate the candidate set to determine which results should be returned (1012). One approach is to determine how close the candidates are within a given file. Ordering information can also be considered. One technique is to use brute force. For example, if all possible valid sequences of pieces within the file are enumerated, brute force can be used to look for those possible sequences. Another technique is to use a state machine to determine, e.g., if blocks of code are in the correct order, and within a threshold distance from each other. If the candidate set contains blocks that are further apart from each other than allowed (configurable, e.g., by Alice), then the result is removed from the candidate set. Once all candidates have been examined, any remaining candidates are returned as the final result set.

Figure 14:
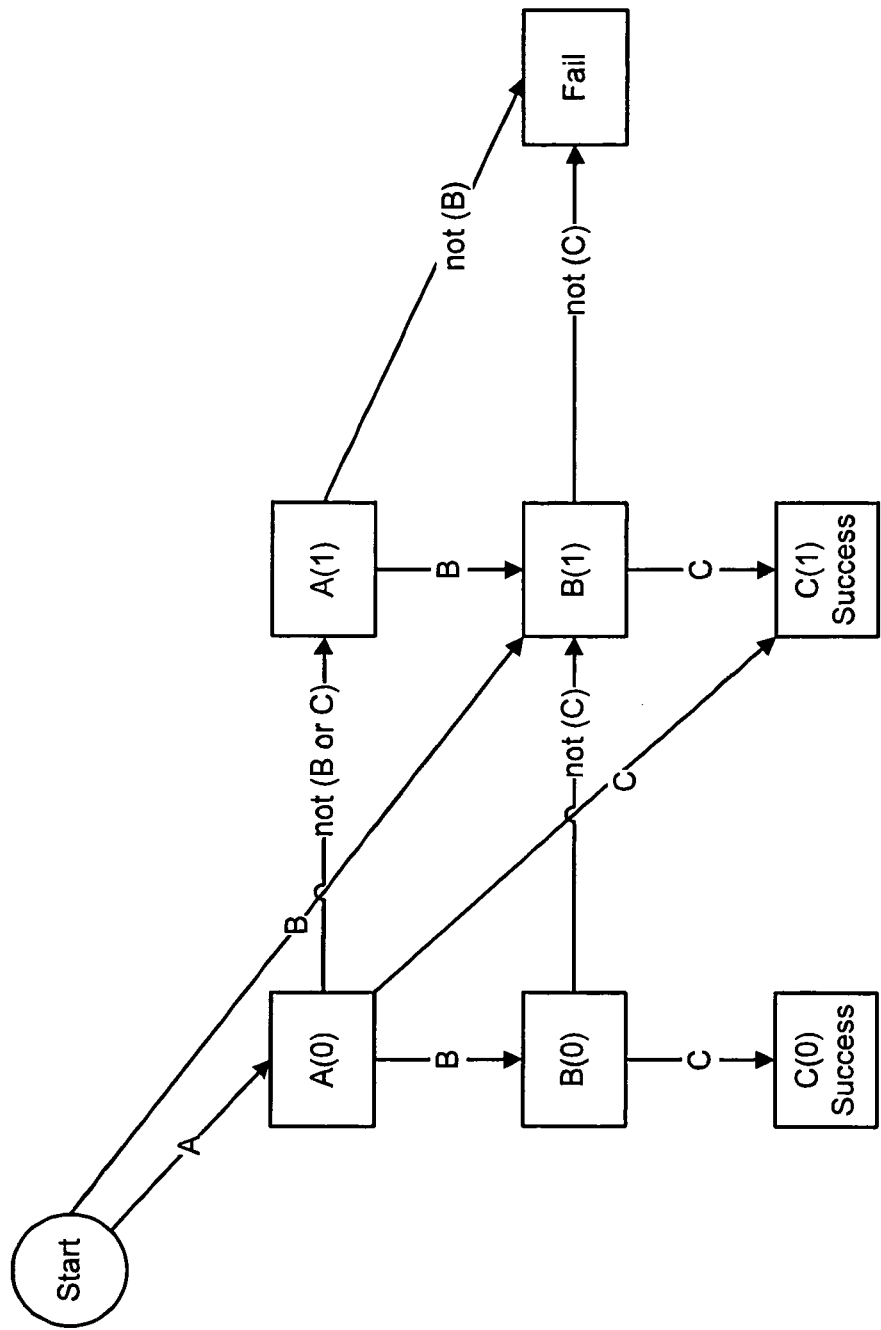
FIG. 14 illustrates an example of a state machine.

FIG. 14 illustrates an example of a state machine. The state machine is constructed based on the size of a gap allowed in determining whether query data is a match for data in index 208. The example shown in FIG. 14 is constructed to tolerate a single insertion or deletion. In the example shown, "A" is "ade8d01ee6895c3a0c95c6022159619def1c04f1," "B" is "83a834253b3d5e1939fdd290c1f944a99c9e624f," "and C" is "cf46323dfc001be907b71ee7e70123b61bbfb07b." After running the candidate set through the state machine the results would be "ade8d01ee6895c3a0c95c6022159619def1c04f1," and "cf46323dfc001be907b71ee7e70123b61bbfb07b."

FIG. 15 illustrates an example of an edit distance computation. In the example shown, a determination is made as to whether the candidate results are sufficiently accurate. Specifically, the original query input is compared to the final result set using edit distance as a metric. The edit distance is then divided by the total characters in the query input. If the number is less than 40%, in some embodiments it is considered sufficiently accurate to return to the user. Techniques such as the Hamming distance formula, the Levenshtein distance formula, the Damerau-Levenshtein distance formula, and the Jaro-Winkler distance formula, are all examples of metrics that can be used.

FIG. 16 illustrates the ranking of results. In the example shown, suppose two matches are found for the query input shown. In various embodiments, when there are multiple matches, the results are ranked based on how close they are to the input query. One way of ranking results is to assign a score to each match based on various characteristics. For example, the results can be ranked using the number of blocks (e.g. statements or functions) that appear in the match, so, the more blocks of the input query that appear in a match, the higher the match will be ranked. Another way is to use a standard edit distance algorithm and order the results with the one that is closest to the input query being the highest ranked. Yet another way is to take into consideration the names of the chunks (e.g. tokens) and rank use a function that assigns a higher score to a match if it contains more chunks that have the same exactly textual value as with the one in the input query.

Interface Examples

Figure 17:
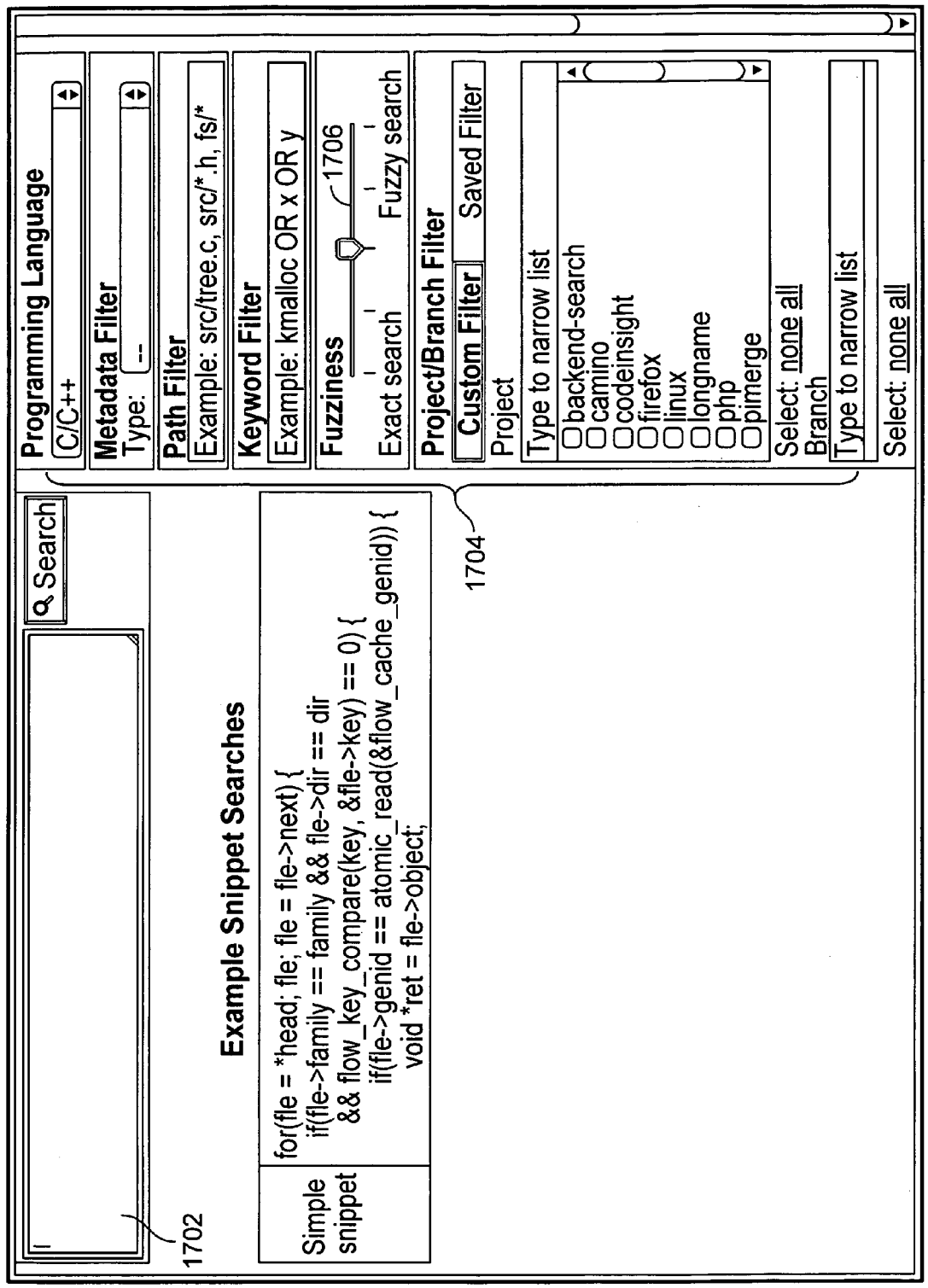
FIG. 17 is an example of an interface, as rendered in a browser.

FIG. 17 is an example of an interface, as rendered in a browser. In the example shown, a user, such as Alice, may provide a query, such as the one illustrated in FIG. 11, and select the "Search" button to initiate a search. In region 1704, various filters are provided that can be used in conjunction with the search. For example, the user can request that results be limited to those programmed in a specific language. Other filters include limiting results based on particular types of associated metadata, based on the results matching a certain path (e.g., having a ".h" extension), based on the results containing a required keyword (e.g., a specific variable name), and based on the results being limited to a particular branch of code. Additionally, a slider 1706 is provided to allow the user to control how many gaps are tolerated in the results.

FIG. 18 is an example of an interface, as rendered in a browser. In the example shown, the results of a search (1802) are presented in region 1804. In the example shown, the results are limited to source code written in C/C++ and may only have a gap of 2. Each entry in region 1804 includes the location of the result (project, branch, file) and contextual lines of code (e.g., appearing before and after the matching lines), as retrieved from repository 204. The matching lines of code are also highlighted (e.g., based on processing performed by highlighter 214. Since there are multiple results, they are ranked based on edit distance. Further, there is one "exact match," a fact that is indicated to the user in region 1806. Additional information, such as the length of time the search took (0.724 sec) and how many results there are in total (726) is also provided in the interface shown in FIG. 18.

FIG. 19 is an example of an interface, as rendered in a browser. In the example shown, Alice has selected one of the results illustrated in FIG. 18 and is presented with the interface shown in FIG. 19. The full text of the file is retrieved from repository 204 and the matching portion of the file is highlighted. Further, region 1904 shows the location of the file in the branch that it belongs to. If multiple matches in a single file exist, a bar is included on the right (not shown) that allows the user to step between the matches within the file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for indexing structured data, comprising:
a communication interface configured receive first structured data;
a processor configured to:
determine a first plurality of subunits in the first structured data;
for a first subunit included in the first structured data, determine a first mapping between the first subunit and a first dictionary entry;
for a second subunit included in the first structured data, determine a second mapping between the second subunit and a second dictionary entry;
aggregate at least the first and second dictionary entries into an aggregation, wherein the aggregation maintains a structure of the first plurality of subunits in the first structured data;
cause the aggregation to be stored in an index along with other aggregations representing other structured data;
receive a search query of second structured data;
determine a search query aggregation based on a mapping between a second plurality of subunits of the second structured data of the search query and dictionary entries, wherein the search query aggregation maintains a structure of the second plurality of subunits in the second structured data; and
determine a candidate set of aggregations in the index for the search query aggregation, wherein the candidate set of aggregations represent structured data that is determined to satisfy the search query of second structured data; and
a memory configured to provide the processor with instructions.

2. The system of claim 1 wherein aggregate at least the first and second dictionary entries includes concatenating a plurality of numerical values.

3. The system of claim 1 wherein aggregate at least the first and second dictionary entries includes performing at least one transformation.

4. The system of claim 3 wherein performing at least one transformation includes performing a hash function.

5. The system of claim 1 wherein the received structured data comprises source code.

6. The system of claim 1 wherein the received structured data comprises system trace data.

7. The system of claim 1 wherein the received structured data comprises log file data.

8. The system of claim 1 wherein cause the aggregation to be stored includes cause metadata associated with the received structured data to be stored.

9. The system of claim 8 wherein the metadata includes at least one of a project name, a location, a file name, and a line number.

10. The system of claim 1 wherein the dictionary is one of a plurality of dictionaries.

11. The system of claim 10 wherein the dictionary is automatically generated.

12. A method for indexing structured data, comprising:
receiving first structured data;
determining a first plurality of subunits in the first structured data;
for a first subunit included in the first structured data, determining a first mapping between the first subunit and a first dictionary entry;
for a second subunit included in the first structured data, determining a second mapping between the second subunit and a second dictionary entry;
aggregating at least the first and second dictionary entries into an aggregation, wherein the aggregation maintains a structure of the first plurality of subunits in the first structured data;
causing the aggregation to be stored in an index along with other aggregations representing other structured data;
receiving a search query of second structured data;
determining a search query aggregation based on a mapping between a second plurality of subunits of the second structured data of the search query and dictionary entries, wherein the search query aggregation maintains a structure of the second plurality of subunits in the second structured data; and
determining a candidate set of aggregations in the index for the search query aggregation, wherein the candidate set of aggregations represent structured data that is determined to satisfy the search query of second structured data.

13. A computer program product for indexing structured data, the computer program product being embodied in a non-transitory computer readable storage medium and comprising computer instructions for:
receiving first structured data;
determining a first plurality of subunits in first structured data;
for a first subunit included in the first structured data, determining a first mapping between the first subunit and a first dictionary entry;

for a second subunit included in the first structured data, determining a second mapping between the second subunit and a second dictionary entry;
aggregating at least the first and second dictionary entries into an aggregation, wherein the aggregation maintains a structure of the first plurality of subunits in the first structured data;
causing the aggregation to be stored in an index along with other aggregations representing other structured data;
receiving a search query of second structured data;
determining a search query aggregation based on a mapping between a second plurality of subunits of the second structured data of the search query and dictionary entries, wherein the search query aggregation maintains a structure of the second plurality of subunits in the second structured data; and
determining a candidate set of aggregations in the index for the search query aggregation, wherein the candidate set of aggregations represent structured data that is determined to satisfy the search query of second structured data.

14. A system for locating structured data, comprising:
a communication interface configured to receive a query;
a processor configured to:
determine a first plurality of subunits in first structured data;
for a first subunit included in the first structured data, determine a first mapping between the first subunit and a first dictionary entry;
for a second subunit included in the first structured data, determine a second mapping between the second subunit and a second dictionary entry;
aggregate at least the first and second dictionary entries into an aggregation, wherein the aggregation maintains a structure of the first plurality of subunits in the first structured data;
search an index for at least the aggregation using a search query aggregation determined from the query, wherein the search query aggregation maintains a structure of a second plurality of subunits of second structured data included in the query; and
return one or more search results based on the search, wherein the one or more search results represent structured data that is determined to satisfy the query of second structured data; and
a memory configured to provide the processor with instructions.

15. The system of claim 14 wherein return one or more search results includes determine a candidate set of results.

16. The system of claim 15 wherein the processor is further configured to evaluate the candidate set of results using a state machine.

17. The system of claim 14 wherein the processor is further configured to filter the one or more results.

18. The system of claim 14 wherein the processor is further configured to sort the one or more search results based on an edit distance.

19. The system of claim 14 wherein the processor is further configured to sort the one or more search results based on a text match score.

20. The system of claim 14 wherein return one or more search results includes provide as output one or more lines of source code.

* * * * *